US010723371B2

(12) United States Patent
Tsumura et al.

(10) Patent No.: US 10,723,371 B2
(45) Date of Patent: Jul. 28, 2020

(54) PLATE SPRING UNIT AND RAILCAR BOGIE

(71) Applicant: KAWASAKI JUKOGYO KABUSHIKI KAISHA, Kobe-shi, Hyogo (JP)

(72) Inventors: Yousuke Tsumura, Kobe (JP); Takehiro Nishimura, Kobe (JP); Fumihide Inamura, Akashi (JP); Tomohei Kobayashi, Akashi (JP); Go Matsubara, Akashi (JP)

(73) Assignee: KAWASAKI JUKOGYO KABUSHIKI KAISHA, Kobe-Shi (JP)

( * ) Notice: Subject to any disclaimer, the term of this patent is extended or adjusted under 35 U.S.C. 154(b) by 274 days.

(21) Appl. No.: 15/579,451

(22) PCT Filed: May 10, 2016

(86) PCT No.: PCT/JP2016/002275
§ 371 (c)(1),
(2) Date: Dec. 4, 2017

(87) PCT Pub. No.: WO2016/194302
PCT Pub. Date: Dec. 8, 2016

(65) Prior Publication Data
US 2018/0141573 A1 May 24, 2018

(30) Foreign Application Priority Data

Jun. 3, 2015 (JP) .................................. 2015-112945

(51) Int. Cl.
*B61F 5/04* (2006.01)
*B61F 5/52* (2006.01)
(Continued)

(52) U.S. Cl.
CPC .................. *B61F 5/04* (2013.01); *B61F 5/30* (2013.01); *B61F 5/52* (2013.01); *F16F 1/18* (2013.01);
(Continued)

(58) Field of Classification Search
CPC ...... B61F 5/04; B61F 5/12; B61F 5/52; B61F 5/30; B61F 5/304; B61F 5/302; F16F 1/18; F16F 1/30
See application file for complete search history.

(56) References Cited

U.S. PATENT DOCUMENTS 2,304,780 A * 12/1942 De Fries ............... B60G 17/023
267/45
5,020,824 A * 6/1991 Mounier-Poulat ..... B60G 5/053
267/266
(Continued)

FOREIGN PATENT DOCUMENTS

CN 203743275 U 7/2014
EP 2 695 791 A1 2/2014
(Continued)

OTHER PUBLICATIONS

Jul. 12, 2016 Search Report issued in International Patent Application No. PCT/JP2016/002275.

*Primary Examiner* — Jason C Smith
(74) *Attorney, Agent, or Firm* — Oliff PLC

(57) ABSTRACT

A plate spring unit applied to a railcar bogie includes: a lower plate spring including both longitudinal direction end portions supported by the respective axle boxes from below, the lower plate spring being made of fiber-reinforced resin; an upper plate spring arranged above the lower plate spring with a gap and including a middle portion pressed from above by a pressing member provided at the cross beam, the upper plate spring being made of fiber-reinforced resin; a middle spacer sandwiched between a middle portion of the
(Continued)

CAR LONGITUDINAL DIRECTION lower plate spring and the middle portion of the upper plate spring; and an end spacer sandwiched between the end portion of the lower plate spring and an end portion of the upper plate spring and allowing relative displacement between the end portion of the lower plate spring and the end portion of the upper plate spring in a longitudinal direction.

14 Claims, 7 Drawing Sheets

(51) Int. Cl.
  *F16F 1/30* (2006.01)
  *F16F 1/18* (2006.01)
  *B61F 5/30* (2006.01)
  *F16F 3/093* (2006.01)
  *B61F 3/02* (2006.01)
  *B61F 5/16* (2006.01)

(52) U.S. Cl.
  CPC ............... *F16F 1/30* (2013.01); *F16F 3/093* (2013.01); *B61F 3/02* (2013.01); *B61F 5/16* (2013.01); *F16F 2224/0241* (2013.01); *Y02T 30/38* (2013.01)

(56) References Cited

U.S. PATENT DOCUMENTS

| | | | | |
|---|---|---|---|---|
| 5,039,071 | A * | 8/1991 | Irle | B61F 5/308 267/52 |
| 6,338,300 | B1 * | 1/2002 | Landrot | B61F 5/305 105/182.1 |
| 10,035,524 | B2 * | 7/2018 | Nakao | B61F 5/302 |
| 10,422,685 | B2 * | 9/2019 | Nishimura | G01G 19/042 |
| 10,427,696 | B2 * | 10/2019 | Nishimura | B61F 5/30 |
| 2005/0116436 | A1 * | 6/2005 | Landrot | B61F 5/305 280/124.109 |
| 2012/0279416 | A1 * | 11/2012 | Nishimura | B61C 9/50 105/218.1 |
| 2014/0123870 | A1 * | 5/2014 | Nishimura | B61F 5/302 105/197.05 |
| 2014/0137765 | A1 * | 5/2014 | Nishimura | B61F 5/52 105/182.1 |
| 2015/0000553 | A1 * | 1/2015 | Kimura | B61F 5/30 105/197.05 |
| 2015/0020708 | A1 * | 1/2015 | Nishimura | B61F 3/02 105/197.05 |
| 2015/0047529 | A1 * | 2/2015 | Nishimura | B61F 5/32 105/199.3 |
| 2015/0083019 | A1 * | 3/2015 | Nishimura | B61F 5/32 105/197.05 |
| 2015/0158506 | A1 * | 6/2015 | Nishimura | B61F 5/52 105/197.05 |
| 2015/0344046 | A1 * | 12/2015 | Nishimura | B61F 5/52 105/199.1 |
| 2015/0344047 | A1 * | 12/2015 | Nishimura | B61F 5/52 105/197.05 |
| 2015/0353105 | A1 * | 12/2015 | Nishimura | B61F 5/52 105/199.1 |
| 2016/0251023 | A1 * | 9/2016 | Nishimura | B61F 5/302 105/198.6 |
| 2016/0304102 | A1 * | 10/2016 | Okumura | B61F 5/302 |
| 2016/0320229 | A1 * | 11/2016 | Nishimura | G01G 19/042 |
| 2018/0141573 | A1 * | 5/2018 | Tsumura | B61F 5/30 |
| 2019/0291753 | A1 * | 9/2019 | Ono | B61F 5/32 |

FOREIGN PATENT DOCUMENTS

| | | |
|---|---|---|
| JP | 2009-185887 A | 8/2009 |
| JP | 2015-003559 A | 1/2015 |
| KR | 10-2012-0132470 A | 12/2012 |
| WO | 2013/008468 A1 | 1/2013 |
| WO | 2013/038673 A1 | 3/2013 |

* cited by examiner

US 10,723,371 B2

PLATE SPRING UNIT AND RAILCAR BOGIE

TECHNICAL FIELD

The present invention relates to a plate spring unit applied to a railcar bogie and a bogie including the plate spring unit.

BACKGROUND ART

PTL 1 discloses a railcar bogie configured such that: side sills are omitted from a bogie frame; and a plate spring achieves the function of a side sill and the function of a primary suspension. The plate spring includes a fiber-reinforced resin upper surface member, a fiber-reinforced resin lower surface member, and a core material member arranged between the upper surface member and the lower surface member, and these members are bonded to one another.

CITATION LIST

Patent Literature

PTL 1: International Publication No. 2013/038673

SUMMARY OF INVENTION

Technical Problem

However, the above plate spring requires a step of bonding and integrating the stacked members. In addition, soundness check of bonded portions of the plate spring needs to be performed after production, which requires labor. Further, the upper surface member, the core material member, and the lower surface member are integrated with each other, so that even when a part of the plate spring is damaged, the entire plate spring needs to be replaced, and therefore, a maintenance cost increases.

An object of the present invention is to improve production efficiency of a plate spring unit for use in a railcar bogie and reduce a maintenance cost of the plate spring unit.

Solution to Problem

A plate spring unit according to one aspect of the present invention is a plate spring unit applied to a railcar bogie, both longitudinal direction end portions of the plate spring unit being supported by respective axle boxes from below, a longitudinal direction middle portion of the pate spring unit supporting a cross beam from below, the plate spring unit including: a lower plate spring including both longitudinal direction end portions supported by the respective axle boxes from below, the lower plate spring being made of fiber-reinforced resin; an upper plate spring arranged above the lower plate spring with a gap and including a middle portion pressed from above by a pressing member provided at the cross beam, the upper plate spring being made of fiber-reinforced resin; a middle spacer sandwiched between a middle portion of the lower plate spring and the middle portion of the upper plate spring; and an end spacer sandwiched between the end portion of the lower plate spring and an end portion of the upper plate spring and allowing relative displacement between the end portion of the lower plate spring and the end portion of the upper plate spring in a longitudinal direction.

According the above configuration, the fiber-reinforced resin lower plate spring and the fiber-reinforced resin upper plate spring are separately provided. Therefore, a step of bonding the lower plate spring and the upper plate spring is unnecessary, and this facilitates soundness check. Thus, production efficiency improves. Even if any one of the lower plate spring and the upper plate spring is damaged, the damaged plate spring is only required to be replaced. Thus, a maintenance cost can be reduced.

Further, the end spacer and the end portion of the upper plate spring are arranged right above the end portion of the lower plate spring supported by the axle box from below. Therefore, even if the upper plate spring is damaged, the axle box can elastically support the cross beam through the lower plate spring. Further, even if the lower plate spring is damaged, the axle box can elastically support the cross beam through the upper plate spring. Therefore, even if any one of the lower plate spring and the upper plate spring is damaged, an elastic support function of the plate spring unit is maintained. Thus, reliability improves. Further, the end portion of the lower plate spring and the end portion of the upper plate spring are displaceable relative to each other in the longitudinal direction through the end spacer. Therefore, a longitudinal direction tensile load or compressive load generated at the lower plate spring and the upper plate spring when the plate spring unit elastically deforms can be reduced. Thus, lives of the plate springs can be lengthened.

Advantageous Effects of Invention

According to the present invention, the production efficiency of the plate spring unit for use in the railcar bogie improves, and the maintenance cost of the plate spring unit can be reduced. Further, the reliability of the plate spring unit improves, and the life of the plate spring can be lengthened.

DESCRIPTION OF EMBODIMENTS

Hereinafter, embodiments will be explained in reference to the drawings. In the following explanations, a direction in which a bogie travels and in which a carbody of a railcar extends is defined as a car longitudinal direction, and a crosswise direction perpendicular to the car longitudinal direction is defined as a car width direction. The car longitudinal direction is also referred to as a forward/rearward direction, and the car width direction is also referred to as a leftward/rightward direction.

Embodiment 1

Figure 1:
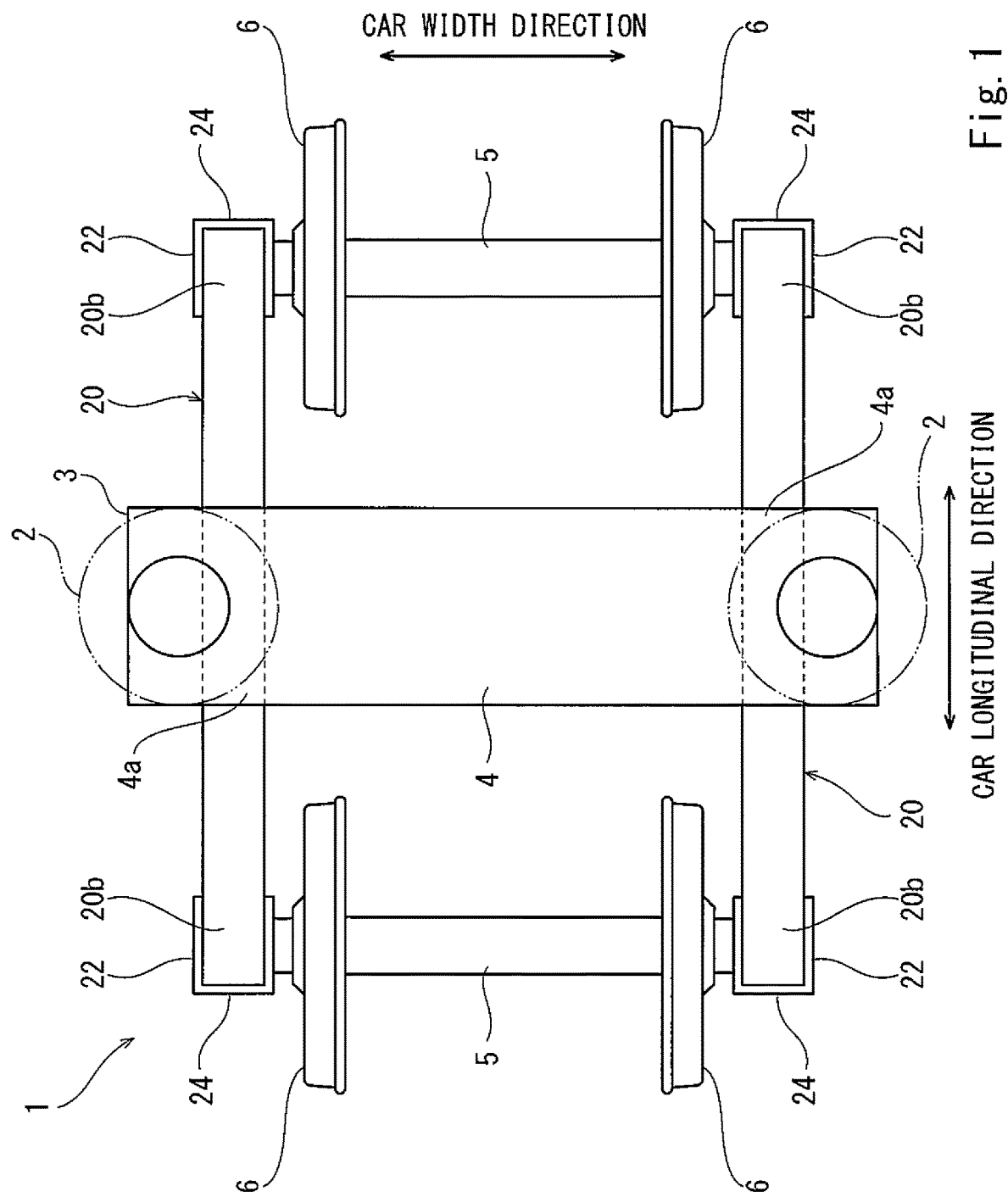
FIG. 1 is a plan view of a railcar bogie according to Embodiment 1.
Figure 2:
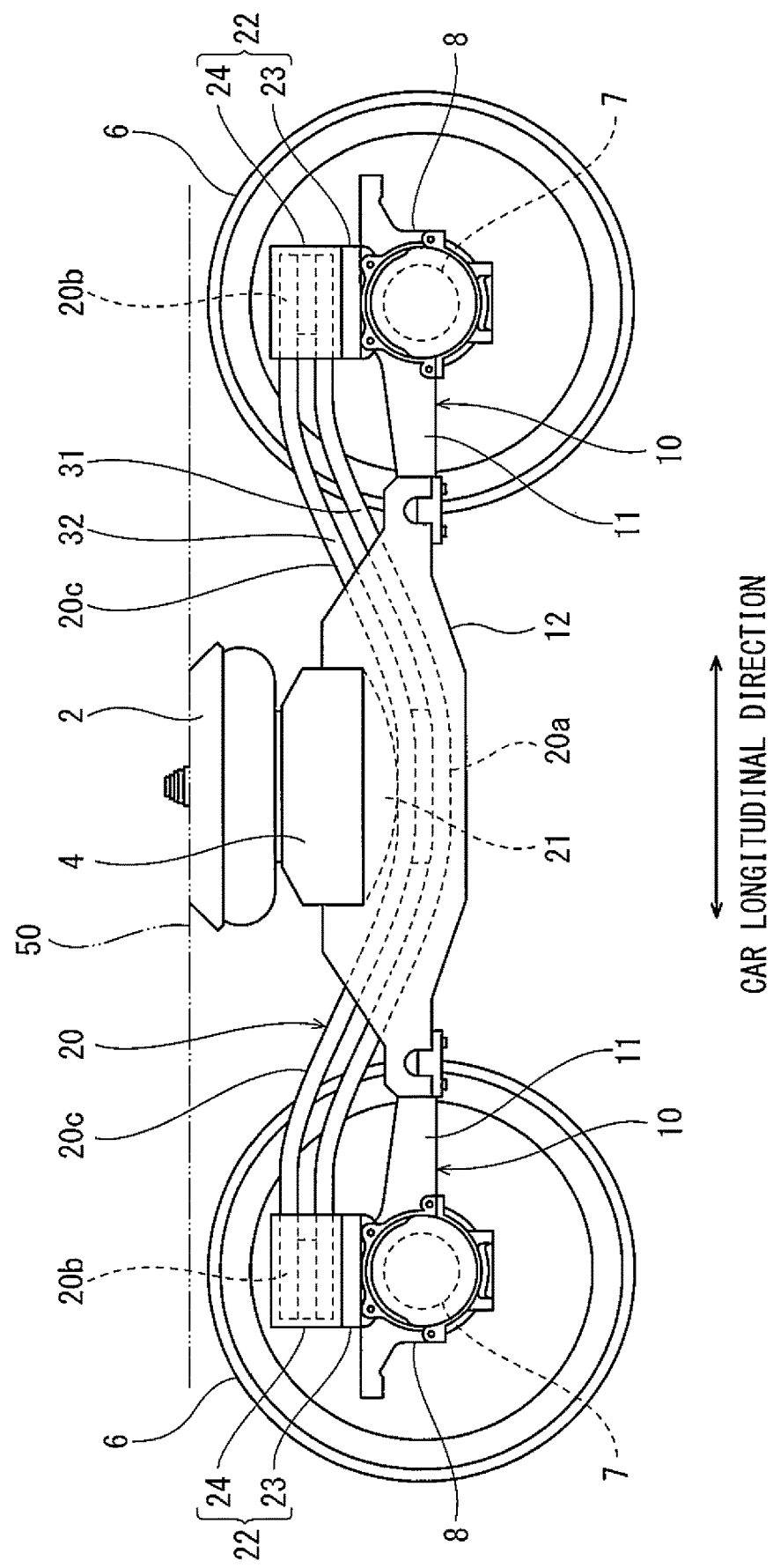
FIG. 2 is a side view of the bogie shown in FIG. 1.

FIG. 1 is a plan view of a railcar bogie 1 according to Embodiment 1. FIG. 2 is a side view of the bogie 1 shown in FIG. 1. As shown in FIGS. 1 and 2, the bogie 1 includes a bogie frame 3 supporting a carbody 50 through air springs 2 that are secondary suspensions. The bogie frame 3 includes a cross beam 4 located at a longitudinal direction middle of the bogie 1 and extending in the car width direction, but does not include any side sills. Axles 5 extending in the car width direction are arranged at both respective car longitudinal direction sides of the cross beam 4. Wheels 6 are fixed to both respective car width direction side portions of each of the axles 5. Bearings 7 rotatably supporting the corresponding axle 5 are provided at the axle 5 so as to be located outside the corresponding wheels 6 in the car width direction and are accommodated in respective axle boxes 8. The axle boxes 8 are coupled by corresponding axle box suspensions 10 to both corresponding car width direction side portions 4a of the cross beam 4. Each of the axle box suspensions 10 includes an axle beam 11 extending from the corresponding axle box 8 toward the cross beam 4 in the car longitudinal direction. To be specific, the bogie 1 is a so-called axle beam type bogie. Each pair of receiving seats 12 projecting toward the corresponding axle beam 11 and spaced apart from each other in the car width direction are fixed to the cross beam 4. A tip end portion of the axle beam 11 is coupled to the receiving seats 12 through a rubber bushing (not shown).

Each of plate spring units 20 extending in the car longitudinal direction is provided between the cross beam 4 and the corresponding axle box 8. Longitudinal direction middle portions 20a of the plate spring units 20 support both respective car width direction side portions of the cross beam 4 from below, and both longitudinal direction end portions 20b of each of the plate spring units 20 are supported by the corresponding axle boxes 8 from below. To be specific, the plate spring unit 20 achieves both the function of a primary suspension and the function of a conventional side sill. The middle portions 20a of the plate spring units 20 are arranged under the cross beam 4. Pressing members 21 each including a lower surface having a circular-arc shape that is convex downward are provided at respective lower portions of the car width direction side portions 4a of the cross beam 4. Each of the pressing members 21 is separably placed on the longitudinal direction middle portion 20a of the corresponding plate spring unit 20 from above and presses the plate spring unit 20 from above. To be specific, the pressing member 21 is not fixed to the plate spring unit 20 in an upward/downward direction and separably contacts the middle portion 20a of the plate spring unit 20 by a downward load generated by gravity from the cross beam 4. Therefore, even when a height difference between the front and rear wheels 6 is generated by, for example, irregularity of a railway track, the plate spring unit 20 can swing along the circular-arc lower surface of the pressing member 21. On this account, followability with respect to the track improves. Further, the swinging of the cross beam 4 is suppressed, and ride quality is prevented from deteriorating.

Supporting members 22 supporting the corresponding end portions 20b of the plate spring units 20 from below are provided at respective upper portions of the axle boxes 8. To be specific, the end portions 20b of the plate spring units 20 are separably placed on respective upper surfaces of the supporting members 22. Each of the supporting members 22 includes a seat member 23 (for example, a rubber member) provided on the axle box 8 and a receiving member 24 provided on the seat member 23. A part of an intermediate portion 20c extending between the middle portion 20a and the end portion 20b in the plate spring unit 20 passes through a space sandwiched between the pair of receiving seats 12. In a side view, the intermediate portion 20c of the plate spring unit 20 is inclined downward toward the middle portion 20a, and the middle portion 20a of the plate spring unit 20 is arranged lower than the end portions 20b of the plate spring unit 20. To be specific, in a side view, the plate spring unit 20 has a shape that is convex downward.

Figure 3:
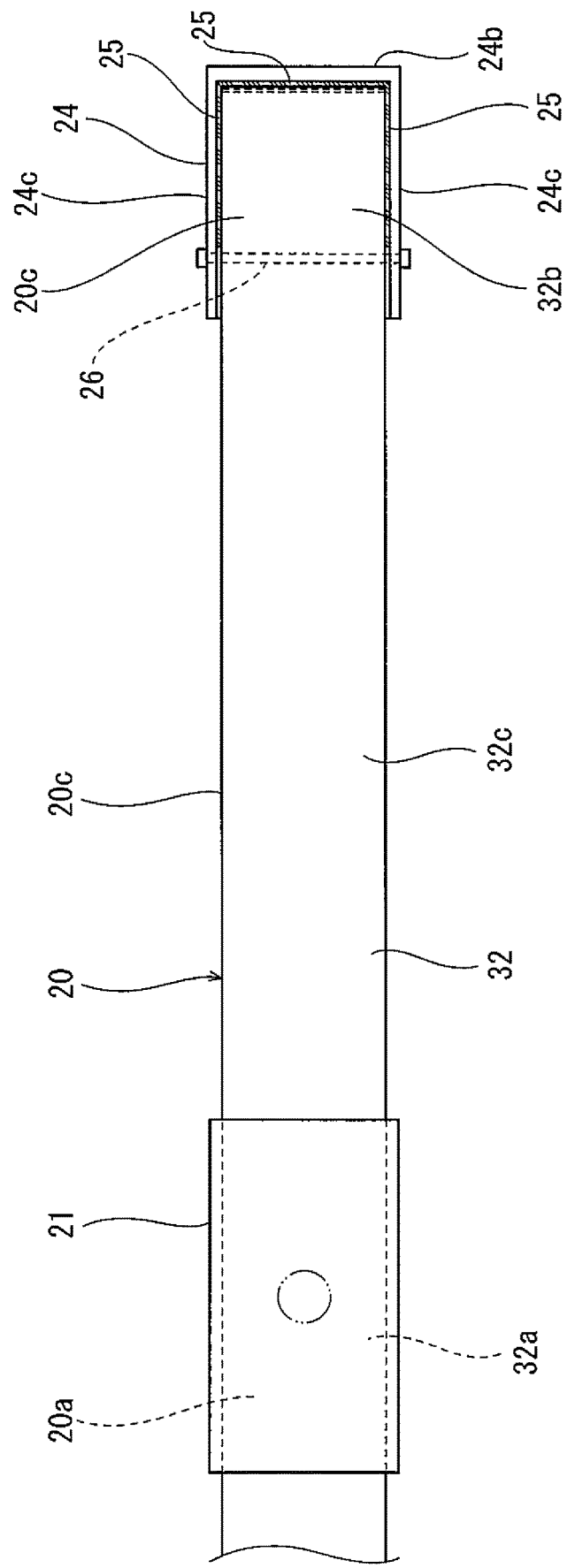
FIG. 3 is an enlarged plan view showing the plate spring unit shown in FIG. 1 and its vicinity.
Figure 4:
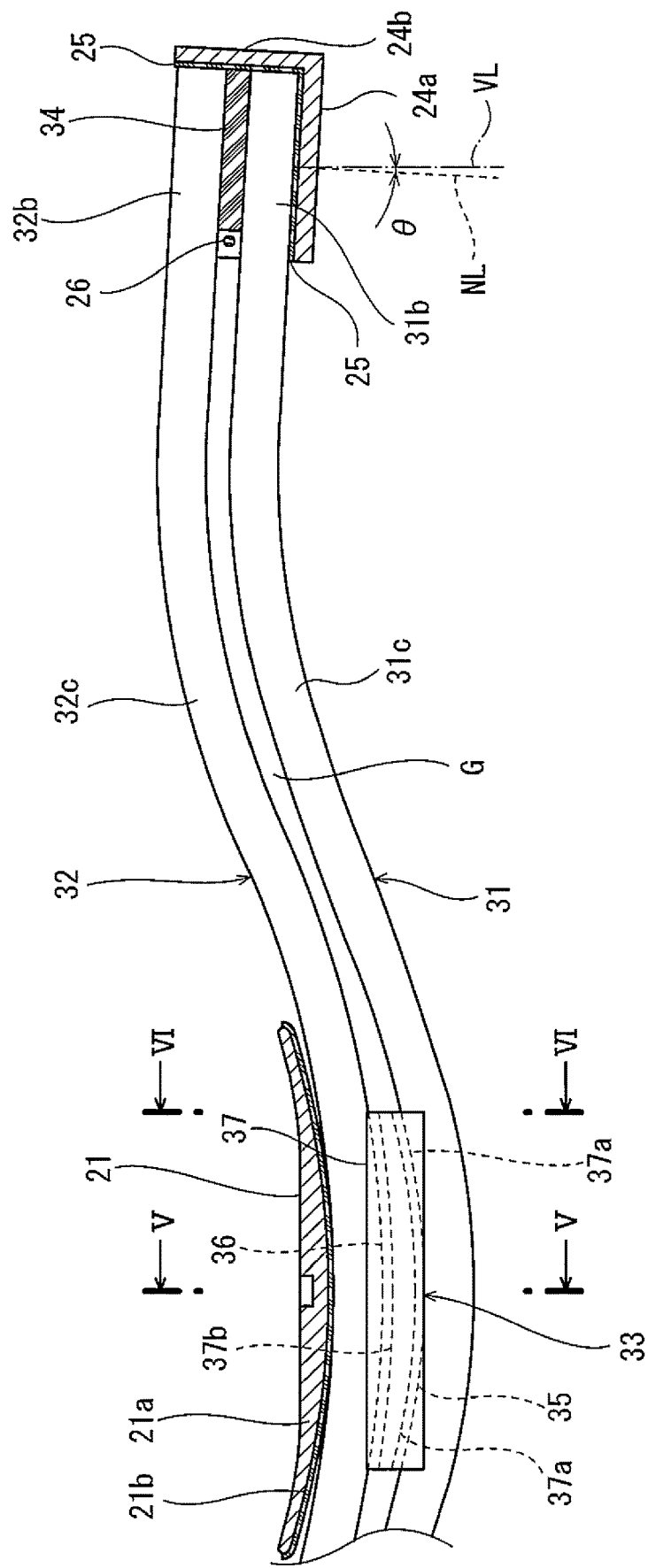
FIG. 4 is an enlarged side view showing the plate spring unit shown in FIG. 2 and its vicinity.

FIG. 3 is an enlarged plan view showing the plate spring unit 20 shown in FIG. 1 and its vicinity. FIG. 4 is an enlarged side view showing the plate spring unit 20 shown in FIG. 2 and its vicinity. As shown in FIGS. 3 and 4, the plate spring unit 20 includes a lower plate spring 31, an upper plate spring 32, a middle spacer 33, and a pair of end spacers 34. The lower plate spring 31 is made of fiber-reinforced resin (for example, CFRP), and both longitudinal direction end portions 31b of the lower plate spring 31 are supported by the axle boxes 8 from below through the supporting members 22. The upper plate spring 32 is made of fiber-reinforced resin (for example, CFRP) and is arranged above the lower plate spring 31 with a gap. In the present embodiment, each of the lower plate spring 31 and the upper plate spring 32 has a constant thickness in the longitudinal direction. The thickness of the lower plate spring 31 and the thickness of the upper plate spring 32 are equal to each other.

Although both the lower plate spring 31 and the upper plate spring 32 are made of fiber-reinforced resin, they do not necessarily have to be made of the same material. For example, in a case where the upper plate spring 32 is made of CFRP, and a part of the lower plate spring 31 or the entire lower plate spring 31 is made of AFRP having excellent impact resistance, this is advantageous against collision with ballast or the like.

The middle spacer 33 is sandwiched between a middle portion 31a of the lower plate spring 31 and a middle portion 32a of the upper plate spring 32. Each of the end spacers 34 is sandwiched between the longitudinal direction end portion 31b of the lower plate spring 31 and a longitudinal direction end portion 32b of the upper plate spring 32. A gap G is formed between the middle spacer 33 and the end spacer 34. To be specific, an intermediate portion 31c between the middle portion 31a and the end portion 31b in the lower plate spring 31 is in noncontact with an intermediate portion 32c between the middle portion 32a and the end portion 32b in the upper plate spring 32 with a gap G.

In a side view, each of the end portion 31b of the lower plate spring 31 and the end portion 32b of the upper plate spring 32 is inclined obliquely downward toward an outer side in the car longitudinal direction when the carbody 50 is not mounted on the bogie 1. To be specific, in a side view, a downward normal line NL perpendicular to lower surfaces of the end portions 31b and 32b of the lower and upper plate springs 31 and 32 is inclined (at an angle θ) from a vertical line VL toward a middle side in the car longitudinal direction when the carbody 50 is not mounted on the bogie 1. When the carbody 50 (empty) is mounted on the bogie 1, the lower plate spring 31 and the upper plate spring 32 bend, and with this, the normal line NL substantially coincides with the vertical line VL. In a side view, each of the end portions 31b and 32b of the lower and upper plate springs 31 and 32 is formed linearly, and a length of this linear portion in the car longitudinal direction is longer than a length of the supporting member 22 in the car longitudinal direction.

The end portion 31b of the lower plate spring 31, the end spacer 34, and the end portion 32b of the upper plate spring 32 overlap one another. When the plate spring unit 20 is mounted on the bogie 1, the end portion 31b of the lower plate spring 31, the end spacer 34, the end portion 32b of the upper plate spring 32, the supporting member 22, and the axle box 8 are arranged at respective positions overlapping one another when viewed from a vertical direction. An upper surface of the receiving member 24 supports the lower surface of the end portion 31b of the lower plate spring 31. Each of the lower surface of the end portion 31b of the lower plate spring 31 and the corresponding upper surface of the receiving member 24 includes a flat surface.

The receiving member 24 includes: a bottom wall portion 24a mounted on the seat member 23; an end wall portion 24b projecting upward from a car longitudinal direction outer side of the bottom wall portion 24a; and a pair of side wall portions 24c projecting upward from both respective car width direction sides of the bottom wall portion 24a. To be specific, movements of the end portion 31b of the lower plate spring 31, the end spacer 34, and the end portion 32b of the upper plate spring 32 relative to the receiving member 24 toward the outer side in the car longitudinal direction by more than a predetermined distance are restricted by the end wall portion 24b. Further, movements of the end portion 31b of the lower plate spring 31, the end spacer 34, and the end portion 32b of the upper plate spring 32 relative to the receiving member 24 toward both sides in the car width direction by more than a predetermined distance are restricted by the side wall portions 24c. An interposed member 25 is inserted between the end portion 20b of the plate spring unit 20 and each of the bottom wall portion 24a, the end wall portion 24b, and the side wall portions 24c. The interposed member 25 is made of a material having lower hardness than the lower plate spring 31 and the upper plate spring 32, and for example, is made of an elastic material such as rubber.

Each of at least a surface of the end spacer 34 which surface contacts the lower plate spring 31 and a surface of the end spacer 34 which surface contacts the upper plate spring 32 is made of a material having lower hardness than the lower plate spring 31 and the upper plate spring 32, and for example, is made of an elastic material such as rubber. The end spacer 34 just contacts the lower plate spring 31 and the upper plate spring 32 and is not bonded thereto. To be specific, when the plate spring unit 20 largely and elastically deforms, the end portion 32b of the upper plate spring 32 moves relative to the end portion 31b of the lower plate spring 31 toward the middle side in the longitudinal direction. In this case, while static friction acts between the end spacer 34 and the plate spring 31, 32, the end spacer 34 elastically deforms in a shearing manner. When transition from the static friction to dynamic friction occurs, the end portion 31b of the lower plate spring 31 slides relative to the end spacer 34.

The receiving member 24 is provided with a restricting member 26 configured to restrict a movement of the end spacer 34 relative to the axle box 8 toward the middle side in the car longitudinal direction by more than a predetermined distance. The restricting member 26 is provided between the lower plate spring 31 and the upper plate spring 32 so as to be located at a car longitudinal direction middle side of the end spacer 34. The restricting member 26 is attached to the side wall portions 24c of the receiving member 24. Further, the restricting member 26 projects from the side wall portions 24c in the car width direction so as to overlap the plate springs 31 and 32 in a plan view. In the present embodiment, the restricting member 26 is a rod-shaped member attached to the side wall portions 24c of the receiving member 24. The restricting member 26 is detachable from the receiving member 24 such that the plate spring unit 20 can be easily assembled to and detached from the receiving member 24.

Each of the intermediate portion 31c of the lower plate spring 31 and the intermediate portion 32c of the upper plate spring 32 includes a region inclined relative to a horizontal direction in a side view. The region is inclined downward as it extends from the end portion 31b, 32b toward the middle portion 31a, 32a. To be specific, each of the lower plate spring 31 and the upper plate spring 32 has an arc shape that is convex downward in a side view.

The pressing member 21 includes: a main body portion 21a that is a rigid body made of metal, resin, or FRP, and includes a circular-arc lower surface that is convex downward; and a sheet portion 21b attached to the lower surface of the main body portion 21a. The sheet portion 21b is made of a material having lower hardness than the main body portion 21a of the pressing member 21 and the upper plate spring 32, and for example, is made of a rubber sheet. When the carbody 50 (see FIG. 2) supported by the bogie 1 is empty, curvature of the lower surface of the pressing member 21 is larger than curvature of an upper surface of the middle portion 32a of the upper plate spring 32. Therefore, when the downward load from the carbody 50 increases, and the plate spring unit 20 is pushed downward by the pressing member 21 to elastically deform, an area of a region of the upper plate spring 32 which region is pushed by the pressing member 21 increases, and a shortest distance from the region of the upper plate spring 32 which region is pushed by the pressing member 21 to a region of the upper plate spring 32 which region is supported by the supporting member 22 shortens. Therefore, as vehicle occupancy of the carbody 50 increases, a spring constant of the plate spring unit 20 increases, and a deformation amount of the plate spring unit 20 can be suppressed.

The middle portion 31a of the lower plate spring 31 and the middle portion 32a of the upper plate spring 32 sandwich the middle spacer 33 so as to be displaceable relative to each other in the longitudinal direction. The middle portion 31a of the lower plate spring 31, the middle spacer 33, the middle portion 32a of the upper plate spring 32, and the pressing member 21 are arranged at respective positions overlapping one another when viewed from the vertical direction. A length of the middle spacer 33 in the car longitudinal direction is shorter than that of the pressing member 21. Both car longitudinal direction end portions of the middle spacer 33 are located at the car longitudinal direction middle side of both car longitudinal direction end portions of the pressing member 21.

Figure 5:
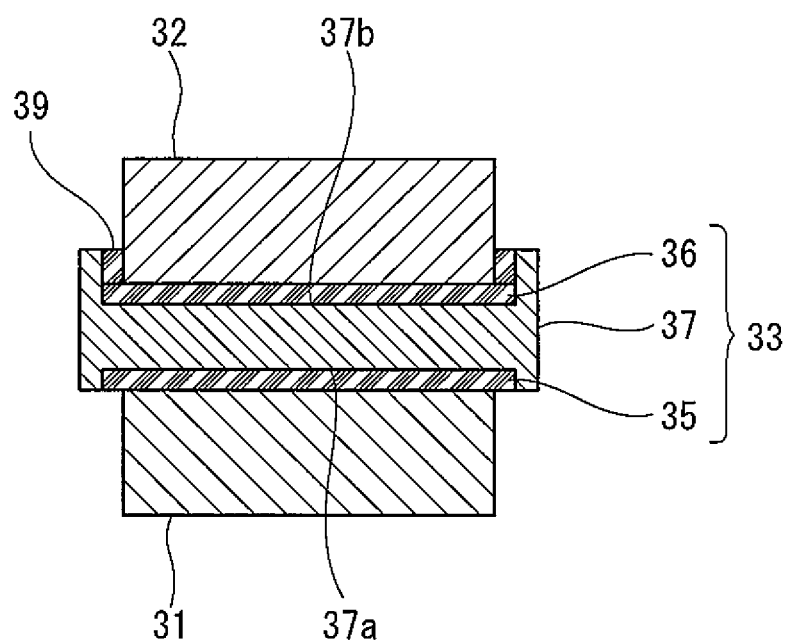
FIG. 5 is a sectional view taken along line V-V of FIG. 4.
Figure 6:
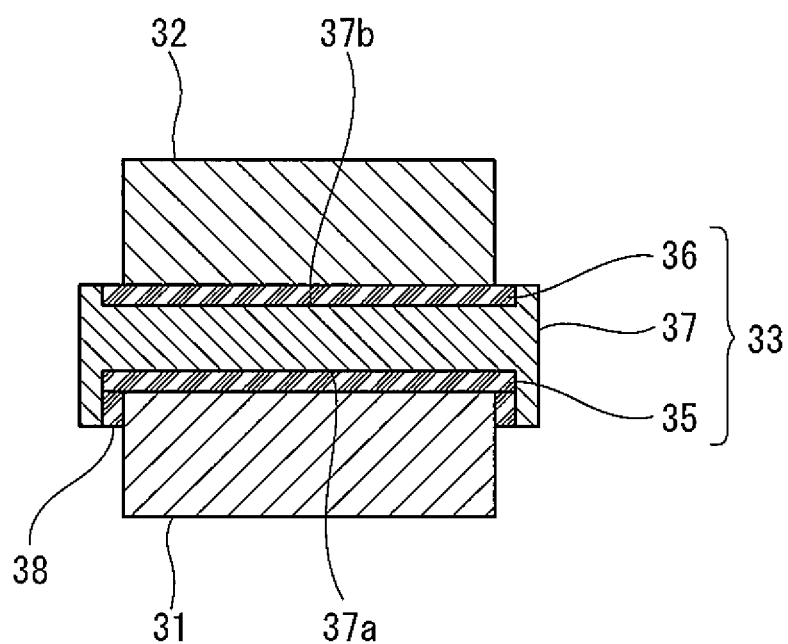
FIG. 6 is a sectional view taken along line VI-VI of FIG. 4.

FIG. 5 is a sectional view taken along line V-V of FIG. 4. FIG. 6 is a sectional view taken along line VI-VI of FIG. 4. As shown in FIGS. 4 to 6, each of at least a surface of the middle spacer 33 which surface contacts the lower plate spring 31 and a surface of the middle spacer 33 which surface contacts the upper plate spring 32 is made of a material having lower hardness than the lower plate spring 31 and the upper plate spring 32, and for example, is made of rubber. In the present embodiment, the middle spacer 33 includes: a lower elastic member 35 contacting an upper surface of the middle portion 31a of the lower plate spring 31; an upper elastic member 36 contacting a lower surface of the middle portion 32a of the upper plate spring 32; and a positioning member 37 sandwiched between the lower elastic member 35 and the upper elastic member 36. The middle spacer 33 just contacts the lower plate spring 31 and the upper plate spring 32 and is not bonded thereto.

The positioning member 37 includes: a lower groove portion 37a that extends in the car longitudinal direction and is open downward; and an upper groove portion 37b that extends in the car longitudinal direction and is open upward. The positioning member 37 has an H-shaped section when viewed from the car longitudinal direction. The lower elastic member 35 and the lower plate spring 31 are fitted in the upper groove portion 37b from below, and the upper elastic member 36 and the upper plate spring 32 are fitted in the upper groove portion 37b from above. A bottom surface of the lower groove portion 37a has a circular-arc shape corresponding to an upper surface of the lower plate spring 31, and a bottom surface of the upper groove portion 37b has a circular-arc shape corresponding to a lower surface of the upper plate spring 32. An interposed member 38 is inserted between an inner side surface of the lower groove portion 37a and the lower plate spring 31, and an interposed member 39 is inserted between an inner side surface of the upper groove portion 37b and the upper plate spring 32. Each of the lower elastic member 35, the upper elastic member 36, and the interposed members 38 and 39 is made of a material having lower hardness than the lower plate spring 31 and the upper plate spring 32, and for example, is made of a rubber sheet.

According to the above-explained configuration, in the plate spring unit 20, the fiber-reinforced resin lower plate spring 31 and the fiber-reinforced resin upper plate spring 32 are separately provided. Therefore, a step of bonding the lower plate spring 31 and the upper plate spring 32 is unnecessary, and this facilitates soundness check. Thus, production efficiency improves. Even if any one of the lower plate spring 31 and the upper plate spring 32 is damaged, the damaged plate spring is only required to be replaced. Thus, a maintenance cost can be reduced.

Further, the end spacer 34 and the end portion 32b of the upper plate spring 31 are arranged right above the end portion 31b of the lower plate spring 31 supported by the axle box 8 through the supporting member 22 from below. Therefore, even if the upper plate spring 32 is damaged, the axle box 8 can elastically support the cross beam 4 through the lower plate spring 31. Further, even if the lower plate spring 31 is damaged, the axle box 8 can elastically support the cross beam 4 through the upper plate spring 32. Therefore, even if any one of the lower plate spring 31 and the upper plate spring 32 is damaged, an elastic support function of the plate spring unit 20 is maintained. Thus, reliability improves. Further, the end portion 31b of the lower plate spring 31 and the end portion 32b of the upper plate spring 32 are displaceable relative to each other in the longitudinal direction through the end spacer 34. Therefore, a longitudinal direction tensile load or compressive load generated at the lower plate spring 31 and the upper plate spring 32 when the plate spring unit 20 elastically deforms can be reduced. Thus, lives of the plate springs 31 and 32 can be lengthened.

Further, each of the lower surface of the end portion 31b of the lower plate spring 31 and an upper surface of the bottom wall portion 24a of the receiving member 24 includes a flat surface. Therefore, when a load transmitted from the cross beam 4 to the plate spring unit 20 fluctuates, angular displacement of the end portion 31b of the lower plate spring 31 relative to the receiving member 24 in a side view hardly occurs, and shear force in the vertical direction is generated in the vicinity of the end portion 31b of the lower plate spring 31. However, since the end portion 32b of the upper plate spring 32 and the end portion 31b of the lower plate spring 31 overlap each other when viewed from the vertical direction, stress concentration on any one of the lower plate spring 31 and the upper plate spring 32 in the vicinity of the end portion of the plate spring unit 20 can be suppressed.

Further, the gap G is provided between the lower plate spring 31 and the upper plate spring 32 so as to be located at a region between the middle spacer 33 and the end spacer 34. Therefore, when the plate spring unit 20 elastically deforms, interference between the lower plate spring 31 and the upper plate spring 32 is prevented, and stress generated at the plate springs 31 and 32 is suppressed. Furthermore, relative positions of the middle portion 31a of the lower plate spring 31 and the middle portion 32a of the upper plate spring 32 are not fixed in the car longitudinal direction. Therefore, even if one of the longitudinal direction end portion 20b of the plate spring unit 20 and the other longitudinal direction end portion 20b of the plate spring unit 20 asymmetrically move (for example, when a wheel load decreases), stress generated at the lower plate spring 31 or the upper plate spring 32 can be reduced.

Further, the lower plate spring 31 is fitted in the lower groove portion 37a of the positioning member 37, and the upper plate spring 32 is fitted in the upper groove portion 37b of the positioning member 37. Therefore, relative positional displacement between the lower plate spring 31 and the upper plate spring 32 in the car width direction can be restricted by the positioning member 37. Furthermore, the lower groove portion 37a is open downward, and the upper groove portion 37b is open upward. Therefore, the plate spring unit 20 can be assembled by simply stacking the lower plate spring 31, the lower elastic member 35, the positioning member 37, the upper elastic member 36, and the upper plate spring 32. Thus, the plate spring unit 20 can be easily assembled and disassembled.

Further, the supporting member 22 is provided with the restricting member 26 configured to restrict the movement of the end spacer 34 relative to the axle box 8 toward the middle side in the car longitudinal direction by more than the predetermined distance. Therefore, the end spacer 34 can be prevented from falling without fixing the end spacer 34 to the lower plate spring 31 and the upper plate spring 32 by bonding or the like. Furthermore, since each of the middle spacer 33 and the end spacer 34 includes an elastic material such as rubber, appropriate damping performance can be given to the plate spring unit 20.

Embodiment 2

Figure 7:
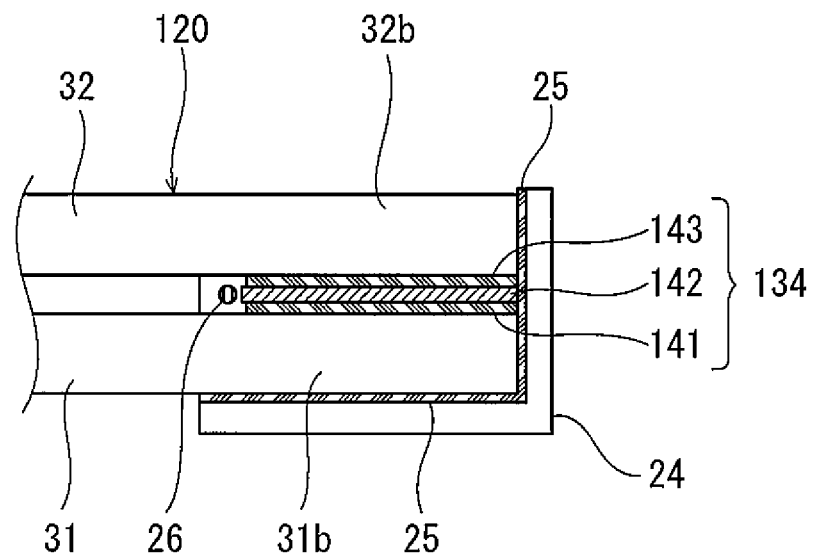
FIG. 7 is an enlarged side view showing major components of the plate spring unit of the bogie according to Embodiment 2.

FIG. 7 is an enlarged side view showing major components of a plate spring unit 120 of a bogie according to Embodiment 2. As shown in FIG. 7, in the plate spring unit 120 of Embodiment 2, an end spacer 134 sandwiched between the end portion 31b of the lower plate spring 31 and the end portion 32b of the upper plate spring 32 has a three-layer structure including a lower plate 141, an intermediate plate 142, and an upper plate 143. Each of the lower plate 141 and the upper plate 143 is made of a material having lower hardness than the lower plate spring 31 and the upper plate spring 32, and for example, is made of an elastic material such as rubber. The intermediate plate 142 is made of metal, resin, FRP, or the like having higher hardness than the lower plate 141 and the upper plate 143.

The lower plate 141 and the upper plate 143 are positioned relative to the intermediate plate 142 in the horizontal direction. Specifically, the lower plate 141 and the intermediate plate 142 include a concave/convex fitting structure (not shown) that inhibits relative displacement between the lower plate 141 and the intermediate plate 142 in the horizontal direction. The upper plate 143 and the intermediate plate 142 also include a concave/convex fitting structure (not shown) that inhibits relative displacement between the upper plate 143 and the intermediate plate 142 in the horizontal direction. The intermediate plate 142 projects toward the longitudinal direction middle side of the lower plate 141 and the upper plate 143. The restricting member 26 provided at the receiving member 24 is arranged at a height that is opposed to the intermediate plate 142 in the horizontal direction. To be specific, the restricting member 26 restricts a movement of the intermediate plate 142 relative to the axle box 8 toward the middle side in the car longitudinal direction by more than a predetermined distance. The restricting member 26 does not contact any of the lower plate 141 and the upper plate 143. Since the other configuration is the same as Embodiment 1, an explanation thereof is omitted.

Embodiment 3

Figure 8:
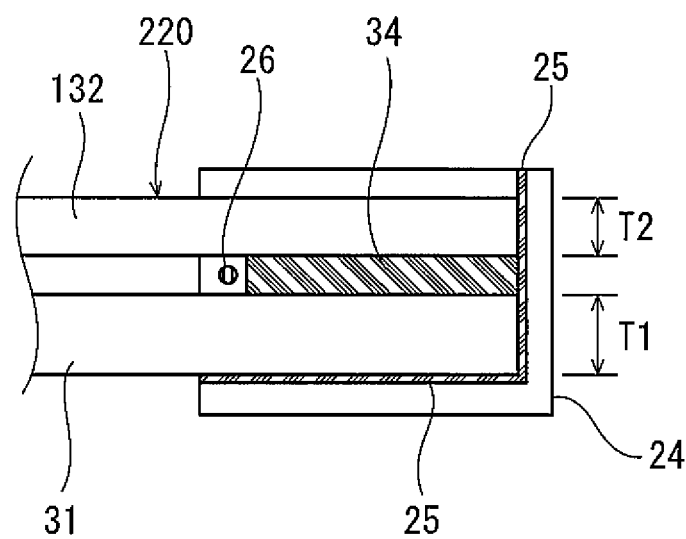
FIG. 8 is an enlarged side view showing major components of the plate spring unit of the bogie according to Embodiment 3.

FIG. 8 is an enlarged side view showing major components of a plate spring unit 220 of a bogie according to Embodiment 3. As shown in FIG. 8, in the plate spring unit 220 of Embodiment 3, the lower plate spring 31 and an upper plate spring 132 are different in thickness from each other. Specifically, each of the lower plate spring 31 and the upper plate spring 132 has a constant thickness in the longitudinal direction. A thickness T1 of the lower plate spring 31 is larger than a thickness T2 of the upper plate spring 132. Only by changing the thicknesses of the plate springs 31 and 132 as above, the spring constant of the entire plate spring unit 220 can be easily changed. Further, only by changing orientation angles of the materials of the plate springs 31 and 132, the spring constant of the entire plate spring unit 220 can be easily changed. Furthermore, by changing the materials of the plate springs 31 and 132, the spring constant of the entire plate spring unit 220 can be easily changed. The lower plate spring 31 and the upper plate spring 132 are separably stacked on the middle spacer 33 (FIG. 4) and the end spacer 34 and are not bonded thereto. Therefore, only by changing a part of the plate springs (for example, only by changing the upper plate spring 132), the spring constant of the plate spring unit 220 can be easily adjusted.

Embodiment 4

Figure 9:
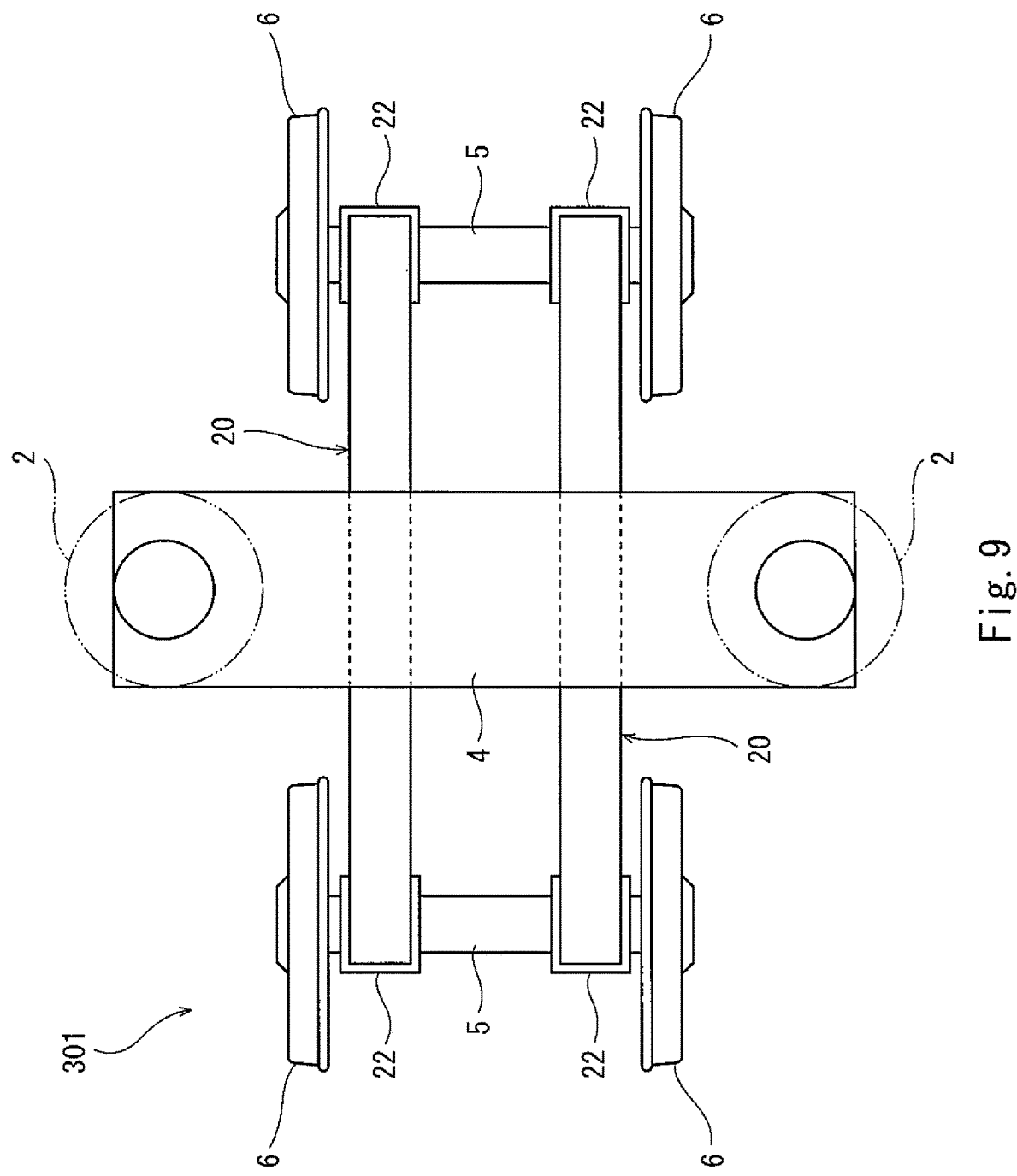
FIG. 9 is a plan view of the bogie according to Embodiment 4.

FIG. 9 is a plan view of a bogie 301 according to Embodiment 4. As shown in FIG. 9, in the bogie 301 of the present embodiment, bearings (not shown) rotatably supporting the corresponding axle 5 are provided at the axle 5 so as to be located inside the corresponding wheels 6 in the car width direction, and each of the plate spring units 20 extending in the car longitudinal direction is provided between the axle box and the cross beam 4. The longitudinal direction middle portions of the plate spring units 20 support both respective car width direction side portions of the cross beam 4 from below, and the longitudinal direction end portions of the plate spring units 20 are supported by the respective axle boxes through the respective supporting members 22 from below. To be specific, when focusing on the fact that the plate spring unit 20 serves as not only a suspension but also a side sill (frame), the bogie 301 may be called an inner frame type bogie. Since the other configuration is the same as Embodiment 1, an explanation thereof is omitted.

The present invention is not limited to the above embodiments, and modifications, additions, and eliminations of components may be made. The above embodiments may be combined arbitrarily. For example, a part of components in one embodiment may be applied to another embodiment.

REFERENCE SIGNS LIST 1, 301 railcar bogie
4 cross beam
5 axle
7 bearing
8 axle box
20, 120, 220 plate spring unit
20a middle portion
20b end portion
20c intermediate portion
21 pressing member
26 restricting member
31 lower plate spring
31a middle portion
31b end portion
32, 132 upper plate spring
32a middle portion
32b end portion
33 middle spacer
34, 134 end spacer
37 positioning member
37a lower groove portion
37b upper groove portion
50 carbody

The invention claimed is:

1. A plate spring unit configured to be applied to a railcar bogie, the plate spring unit comprising:
   a lower plate spring including an end portion along a longitudinal direction, the end portion being configured to be supported by an axle box of the railcar bogie at a lower side surface of the lower plate spring, the lower plate spring being made of fiber-reinforced resin;
   an upper plate spring disposed above the lower plate spring with respect to a vertical direction of the plate spring unit and forming a gap between the upper plate spring and the lower plate spring, the upper plate spring including a middle portion pressed by a pressing member of a cross beam of the railcar bogie, the pressing member pressing an upper side surface of the middle portion of the upper plate spring, and the upper plate spring being made of fiber-reinforced resin;
   a middle spacer sandwiched between a middle portion of the lower plate spring and the middle portion of the upper plate spring; and
   an end spacer sandwiched between the end portion of the lower plate spring on an upper side surface of the lower plate spring and an end portion of the upper plate spring on a lower side surface of the upper plate spring, the end spacer being configured to allow relative displacement in the longitudinal direction between the end portion of the lower plate spring and the end portion of the upper plate spring.

2. The plate spring unit according to claim 1, wherein the middle portion of the lower plate spring and the middle portion of the upper plate spring sandwich the middle spacer so as to be displaceable relative to each other in the longitudinal direction.

3. The plate spring unit according to claim 2, wherein:
   the middle spacer includes:

a lower groove portion extending in the longitudinal direction and is-open downward with respect to the vertical direction of the plate spring unit, and an upper groove portion extending in the longitudinal direction and open upward with respect to the vertical direction of the plate spring unit, and the lower plate spring is fitted to the lower groove portion from below the lower groove portion with respect to the vertical direction of the plate spring unit, and the upper plate spring is fitted to the upper groove portion from above the upper groove portion with respect to the vertical direction of the plate spring unit.

4. A railcar bogie comprising:

the plate spring unit according to claim 3;

the cross beam supporting a carbody of a railcar; and a plurality of axle boxes, including the axle box of the railcar bogie, arranged at respective car longitudinal direction sides of the cross beam and accommodating respective bearings supporting an axle, wherein the axle box, the end portion of the lower plate spring, the end spacer, and the end portion of the upper plate spring are arranged overlapping one another when viewed from the vertical direction.

5. The railcar bogie according to claim 4, further comprising a restricting member disposed between the lower plate spring and the upper plate spring so as to be located at a car longitudinal direction middle side of the end spacer, the restricting member being configured to restrict a movement of the end spacer relative to the axle box toward the car longitudinal direction middle side by more than a predetermined distance.

6. A railcar bogie comprising:

the plate spring unit according to claim 2;

the cross beam supporting a carbody of a railcar; and a plurality of axle boxes, including the axle box of the railcar bogie, arranged at respective car longitudinal direction sides of the cross beam and accommodating respective bearings supporting an axle, wherein the axle box, the end portion of the lower plate spring, the end spacer, and the end portion of the upper plate spring are arranged overlapping one another when viewed from the vertical direction.

7. The railcar bogie according to claim 6, further comprising a restricting member disposed between the lower plate spring and the upper plate spring so as to be located at a car longitudinal direction middle side of the end spacer, the restricting member being configured to restrict a movement of the end spacer relative to the axle box toward the car longitudinal direction middle side by more than a predetermined distance.

8. The plate spring unit according to claim 1, wherein:

the middle spacer includes:

a lower groove portion extending in the longitudinal direction and open downward with respect to the vertical direction of the plate spring unit, and an upper groove portion extending in the longitudinal direction and open upward with respect to the vertical direction of the plate spring unit, and the lower plate spring is fitted to the lower groove portion from below the lower groove portion with respect to the vertical direction of the plate spring unit, and the upper plate spring is fitted to the upper groove portion from above the upper groove portion with respect to the vertical direction of the plate spring unit.

9. A railcar bogie comprising:

the plate spring unit according to claim 8;

the cross beam supporting a carbody of a railcar; and a plurality of axle boxes, including the axle box of the railcar bogie, arranged at respective car longitudinal direction sides of the cross beam and accommodating respective bearings supporting an axle, wherein the axle box, the end portion of the lower plate spring, the end spacer, and the end portion of the upper plate spring are arranged overlapping one another when viewed from the vertical direction.

10. The railcar bogie according to claim 9, further comprising a restricting member disposed between the lower plate spring and the upper plate spring so as to be located at a car longitudinal direction middle side of the end spacer, the restricting member being configured to restrict a movement of the end spacer relative to the axle box toward the car longitudinal direction middle side by more than a predetermined distance.

11. A railcar bogie comprising:

the plate spring unit according to claim 1;

the cross beam supporting a carbody of a railcar; and a plurality of axle boxes, including the axle box of the railcar bogie, arranged at respective car longitudinal direction sides of the cross beam and accommodating respective bearings supporting an axle, wherein the axle box, the end portion of the lower plate spring, the end spacer, and the end portion of the upper plate spring are arranged overlapping one another when viewed from the vertical direction.

12. The railcar bogie according to claim 11, further comprising a supporting member disposed at an upper portion of the axle box, the supporting member including an upper surface supporting a lower surface of the end portion of the lower plate spring, the lower surface of the end portion of the lower plate spring and the upper surface of the supporting member including respective flat surfaces.

13. The railcar bogie according to claim 12, further comprising a restricting member disposed between the lower plate spring and the upper plate spring so as to be located at a car longitudinal direction middle side of the end spacer, the restricting member being configured to restrict a movement of the end spacer relative to the axle box toward the car longitudinal direction middle side by more than a predetermined distance.

14. The railcar bogie according to claim 11, further comprising a restricting member disposed between the lower plate spring and the upper plate spring so as to be located at a car longitudinal direction middle side of the end spacer, the restricting member being configured to restrict a movement of the end spacer relative to the axle box toward the car longitudinal direction middle side by more than a predetermined distance.

* * * * *